United States Patent
Key et al.

(10) Patent No.: US 7,087,302 B2
(45) Date of Patent: Aug. 8, 2006

(54) GLASS SIZING COMPOSITION

(75) Inventors: Charles R. Key, Simpsonville, SC (US); Rajeev Farwaha, Belle Mead, NJ (US)

(73) Assignee: Celanese International Corporation, Dallas, TX (US)

( * ) Notice: Subject to any disclaimer, the term of this patent is extended or adjusted under 35 U.S.C. 154(b) by 0 days.

(21) Appl. No.: 10/372,370

(22) Filed: Feb. 24, 2003

(65) Prior Publication Data

US 2004/0166313 A1    Aug. 26, 2004

(51) Int. Cl.
*B32B 9/00*    (2006.01)
*B60C 1/00*    (2006.01)

(52) U.S. Cl. .............. 428/392; 428/375; 524/494; 523/206; 523/217

(58) Field of Classification Search ............ 428/375, 428/392, 391; 524/494; 523/206, 217
See application file for complete search history.

(56) References Cited

U.S. PATENT DOCUMENTS

| 3,997,306 | A | 12/1976 | Hedden ................ 65/3 C |
| 4,126,729 | A | 11/1978 | Richardson et al. ........ 428/389 |
| 4,457,970 | A | 7/1984 | Das et al. .................... 428/290 |
| 4,789,593 | A | 12/1988 | Das ............................ 428/391 |
| 5,491,182 | A | 2/1996 | Key et al. ................... 523/206 |
| 5,665,470 | A | 9/1997 | Key et al. ................... 428/378 |
| 6,172,149 | B1 * | 1/2001 | Shah et al. ................. 524/272 |
| 2004/0010080 | A1 * | 1/2004 | Hutter et al. .............. 524/832 |

FOREIGN PATENT DOCUMENTS

WO    WO 96/15075    5/1996

* cited by examiner

*Primary Examiner*—Jill Gray
(74) *Attorney, Agent, or Firm*—Michael W. Ferrell; Aaron L. Webb

(57) ABSTRACT

The present invention relates to a sizing composition for use on glass fibers which are used to reinforce plastic resins used in the formation of fiber-reinforced plastics (FRPs). The sizing composition comprises a copolymer formed from at least one functional monomer that is selected from the group consisting of hydroxy, phenyl and alkoxylated functional groups. The glass fibers sized with the sizing composition of the invention have excellent computability with resins used in forming FRPs, as seen by a low level of white glass.

4 Claims, No Drawings

GLASS SIZING COMPOSITION

FIELD OF THE INVENTION

The invention relates to a glass sizing composition having a copolymer containing phenyl, hydroxy, or alkoxy functionality. The composition provides excellent compatibility with polymeric resin material, as seen in low amounts of "white glass".

BACKGROUND OF THE INVENTION

A sizing composition, or chemical treatment, is generally applied to all glass fibers shortly after they have been formed, as a means to protect the glass fibers from breaking and marring during processing. As used herein, glass fibers collectively refers to continuous glass fiber filaments formed by the attenuation of a stream, or streams, of molten glass to strands formed when continuous glass fibers filaments are gathered together.

Glass fibers are useful in providing reinforcement for polymeric resin materials used in forming fiber-reinforced plastics (FRPs). The glass fibers provide dimensional stability to the polymeric materials, due to their high tensile strength, heat resistance and moisture resistance. In addition to protecting the glass fiber during manufacture, the sizing composition improves the compatibility of the glass fibers with matrix resins.

One measure of compatibility, or incompatibility, between the glass fiber and resin matrix is the existence of so called white glass. By "white glass", as used herein is meant that in a clear fiberglass reinforced resin sheet, when laid on a black background, white fiberglass strands can be seen. The showing of white glass indicates a lack of contact between the sized glass fibers and the resin. This lack of contact generally leads to a lower strength panel.

The sizing of glass fibers which are used to reinforce plastic resin matrices is well known. For instance, U.S. Pat. No. 3,997,306 discloses glass fiber size which contains a phenolic epoxy resin, the reaction product of the partial ester of a polycarboxylic acid containing one or more unesterified carboxyl groups with a compound containing more than one epoxy group, an amino silane coupling agent, a methacryloxy alkyl trialkoxy silane, and a non-ionic surface active agent.

U.S. Pat. No. 4,126,729 discloses gun roving glass fibers coated with an aqueous-based size comprising an epoxidized polyvinyl acetate copolymer in combination with a vinyl acetate-ethylene copolymer and a vinyl acetate copolymer.

U.S. Pat. No. 4,457,970 discloses treated glass fiber strands have on the glass an aqueous treating composition or a dried residue thereof. The treating composition has a vinyl-containing coupling agent, an epoxidized thermoplastic polymer or copolymer, an organo-reactable silane coupling agent in an unhydrolyzed and/or partially hydrolyzed condition or an interaction product of the epoxidized polymer or copolymer and organo-reactable silane coupling agent, and a glass fiber lubricant. U.S. Pat. No. 4,789,593 discloses glass fibers treated with an aqueous chemical treating composition having a polar thermoplastic film-forming polymer, coupling agent and lubricant. The aqueous emulsion of the thermoplastic film-forming polymer has an average amount of aliphatic unsaturation of less than around 1.5 aliphatic double bonds/mole of polymer and has a ratio of aliphatic unsaturation to aromatic unsaturation not to exceed 0.1.

U.S. Pat. Nos. 5,491,182 and 5,665,470 describe sizing compositions in which the average molecular weight of the polymer is less than 55,000. The polymer sizing composition could be formed from any number of different monomers including examples containing glycidyl methacrylate and hydroxypropyl acrylate. The patent solved the problem of improving the clarity of an FRP, especially in acrylic resins.

U.S. patent application Ser. No. 10/283,406 describes fiberglass copolymer binders containing both acid and hydroxyl functionality. The binders are further crosslinked to form a continuous bonded mess of glass fibers, or fiberglass.

It is desirable to have sizing compositions which provide very good compatibility between the glass fibers and polymer matrices used in forming reinforced plastics.

Surprisingly it has been found that a sizing composition having a copolymer binder containing phenyl, hydroxy, or alkoxy functionality increases the compatibility between glass fiber and resin matrix, as seen by a reduction in white glass.

SUMMARY OF THE INVENTION

The present invention is directed to sizing compositions for use on glass fibers which are used to reinforce plastic resins used in the formation of fiber-reinforced plastics. The sizing composition comprises a copolymer formed from at least one functional monomer, selected from the group consisting of hydroxy, phenyl and alkoxylated functional groups The invention is also directed to glass fibers treated with such sizing compositions, and FRPs prepared from such treated glass fibers.

DETAILED DESCRIPTION OF THE INVENTION

The present invention relates to sizing compositions containing copolymer binders having hydroxy, phenyl, and/or alkoxy functional groups. As used herein, the terms alkoxy functional and alkoxylated function are used to represent the same functionality. The sizing composition is a combination of one or more thermoplastic, film-forming polymer binders, plus adjuvants such as lubricants and silanes. The sizing is useful for sizing glass fibers that may be used to form fiberglass reinforced plastics. By copolymer as used herein is meant a polymer composed of at least two different monomers. It may contain three of more different monomers. The copolymer may have a random, block, star or other known polymer architecture.

The copolymer sizing binder is formed from at least one hydroxy, phenyl, or alkoxylated functional monomer, or a mixture thereof. The total level of functional monomer or monomers in the copolymer is between 0.1 and 30 percent by weight, and preferably from 0.2 to 20 percent by weight. The copolymer formed is non-water soluble and will exist as a polymer emulsion or dispersion.

Hydroxyl monomers useful in forming the copolymer used in the present invention include, but are not limited to, hydroxy propyl (meth) acrylate, hydroxy ethyl (meth) acrylate, hydroxy butyl (meth) acrylate, 2(2-ethoxyethoxy) ethyl acrylate, methoxy polyethylene glycol monomethacrylate, ethoxylated hydroxyethyl methacrylate, propylene glycol monomethacrylate. The hydroxyl monomer could also be a copolymerizable surfactant monomer, such as allyl polyethyleneglycol ethers, 4-vinyl butyl polyethyleneglycol ethers, methacrylic acid esters of polyethyleneglycol ethers.

Phenyl functional monomers include monomers containing phenyl groups not directly attached to an ethylenical unsaturation. Thus styrene, methyl styrene, and divinyl benzene would not be included. Examples of phenyl-functional monomers useful in the present invention include, but are not limited to, 2-phenoxyethyl acrylate, 2-phenoxyethyl methacrylate, ethoxylated nonyl phenol acrylate, ethoxylated nonyl phenol methacrylate, alkoxylated nonyl phenol acrylate; multi-ring phenyl compounds including anthracene and phenanthrene derivatives such as for example 9-methacryloxy anthracene, 9-methacryloxymethyl-10-methyl anthracene, 2-hydroxy-4-methyl benzophenone, and 4-N,N-dimethylaminobenzophenone.

Alkoxylated functional monomers are those having the formula —(RO)$_n$— where R is a methyl, ethyl, propyl, or butyl group, or a mixture of said groups. The number of repeating units (n) is from 1 to 50, preferably 1 to 30, and most preferably from 5 to 20.

The functional copolymer will contain at least one other ethylenically unsaturated monomer, in addition to the functional monomer. The other ethylenically unsaturated monomers may be at a level of up to 99.9 percent by weight, based on the total monomer. One skilled in the art will recognize that different monomers, and percentages of said monomers can be optimized to obtain the end-use properties desired in the copolymer. For example, hydrophobic monomers can be used to increase the water-resistance of the glass fibers. Monomers can also be use to adjust the Tg of the copolymer to meet the end-use application requirements. Useful monomers include, but are not limited to, (meth)acrylates, maleates, (meth)acrylamides, itaconates, styrenics, acrylonitrile, nitrogen functional monomers, vinyl esters, alcohol functional monomers, and unsaturated hydrocarbons. Preferably the copolymer is free of thermosetting monomers such as glycidyl acrylate or glycidyl methacrylate.

Preferably the copolymer is formed from a vinyl ester monomer. Vinyl ester monomers include, but are not limited to, vinyl acetate, vinyl formate, vinyl propionate, vinyl butyrate, vinyl isobutyrate, vinyl valerate, vinyl versatate, vinyl 2-ethyl-hexanoate. In a preferred embodiment, the polymer binder contains vinyl ester monomers at from 50 to 99.9 weight percent, preferably 70 to 99 weight percent, based on the total amount of polymer. One preferred embodiment is a polymer containing vinyl acetate, butyl acrylate, and a functional monomer. It has been found that the use of butyl acrylate monomer can help to incorporate hydroxy ethyl methacrylate into a vinyl acetate copolymer.

In another embodiment, the copolymer contains primarily acrylic monomers.

Low levels of crosslinking monomers may also be used to form the polymer, though crosslinking generally increases incompatibility and therefore will not be present in any great amount. Chain-transfer agent may also be used, as known in the art, in order to regulate chain length and molecular weight. The chain transfer agents may be multifunctional so as to produce star type polymers.

The sizing composition may contain one or more polymer binders. The binders may consist of a single functionalized binder, a mixture of functionalized binders, or functionalized binders blended with one or more non-functionalized homopolymers or copolymers. In one embodiment a highly functionalized copolymer is blended with a vinyl acetate homo- or co-polymer. The level of functional monomer in the final polymer binder composition will be from 0.1 to 30, based on the total weight of polymer solids.

The copolymer binder and other binders in the sizing composition are in the form of water-insoluble polymers in an aqueous emulsion or dispersion, formed by means known in the art. Preferably the polymers are formed by free-radical emulsion polymerization by means known in the art. The emulsion latex may be formed in a batch process, a semi-batch process, or a continuous process. The emulsion can be stabilized by surfactants, colloids, or a combination thereof.

The weight average molecular weight of the copolymer is generally from 30,000 to 2,000,000, and preferably from 30,000 to 400,000. It has been found that it is advantageous in terms of processing to have a copolymer binder with a molecular weight of greater than 55,000, and preferably greater than 60,000.

The sizing composition will contain from 1 to 50 percent, preferably 2 to 25 percent, and more preferably 5 to 10 percent of the copolymer binder The sizing compositions will contain a major proportion of water, preferably greater than 50 weight percent. More preferably, the sizing compositions will contain greater than about 75 weight percent of water. The sizing composition will have a solids level of from 1 to 50, preferably 2 to 25, and most preferably 5 to 10 percent, depending on the method to be used in applying the sizing to the glass fibers. The solids level is a combination of the copolymer binder, other polymeric binders, and adjuvants.

The copolymer sizing composition may optionally be formulated with one or more adjuvants, such as, for example, silane coupling agents, lubricants, antistats, and defoamers. The adjuvants are generally added at levels of less than 20 percent, based on the weight of the copolymer binder.

The sizing compositions may contain from about 0.01 to about 5 weight percent of a silane coupling agent, based on the total weight of the sizing composition, preferably from about 0.1 to about 2 weight percent of the coupling agent. Any suitable silane coupling agent, such as gamma-methacryloxypropyltrimethoxysilane, an be employed. An exemplary silane coupling agent is available from OSI Specialties, Inc., Danbury, Conn., under the tradename Silane A-174. Other exemplary coupling agents include vinyltrichlorosilane, vinyltriethoxysilane, vinyltriacetoxysilane and vinyltrimethoxysilane, all available from OSI Specialties, Inc.

The sizing compositions may contain from about 0.05 to about 1.0 weight percent of a lubricant suitable for use in such sizing compositions, based on the total weight of the sizing composition, preferably from about 0.1 to about 0.25 weight percent of the lubricant. An exemplary cationic polyethyleneimine polyamide salt lubricant is commercially available from Cognis Corporation, Ambler, Pa., under the tradename Emery 6760.

The sizing compositions can contain from about 0.01 to about 0.05 weight percent of acetic acid, based on the total weight of the sizing composition, preferably from about 0.01 to about 0.03 weight percent of acetic acid. As those skilled in the art will appreciate, the compositions further may include other materials commonly used in sizing compositions, such as Werner-type chromium complexes, protective colloids, plasticizers, anti-foaming-agents, surfactants, and the like.

The sizing compositions may be applied to the glass fibers by any methods known to those skilled in the art. They may be applied to the glass fiber filaments, to glass fiber strands or to glass fiber rovings. Glass fiber strands are formed when the continuous glass fiber filaments are gathered together in forming and typically contain from about 200–1600 filaments. Glass rovings typically contain from about 40–60 glass strands. Known methods of application are discussed in U.S. Pat. Nos. 3,997,306, 4,457,970 and 4,789,593, all of which are hereby incorporated by reference in their entirety. The glass fibers are generally treated with from 0.2 to 5 percent, preferably 0.5 to 2 percent by weight, and most preferably 0.5 to 1 percent by weight, of the sizing composition on a solids/solids basis.

The plastic resin that is reinforced by the glass fibers of the invention may be a thermoplastic or thermosetting resin, typically used to prepare FRPs. The FRPs may be formed by any method known to those skilled in the art. Such methods are disclosed, for example, in U.S. Pat. Nos. 4,457,970 and 4,789,593. Preferably, the sized glass fibers are chopped to a desired length and incorporated into the plastic resin. The plastic resin may be any resin which is compatible with the sizing composition to yield the desired properties. Examples of such resins include, but are not limited to, styrenated polyesters, acrylic polyesters, vinyl ester resins, epoxy and epoxy novalac resins, nylon, acrylics, polyethylene, polypropylene, urethane, and ABS resins. The sizing composition of the present invention is especially useful in resins that are difficult to wet-out, such as low styrene epoxy resins, and vinyl ester resins.

Fiberglass reinforced plastics are useful in many end-use applications, including, but not limited to, sheet molding compounds (SMC), gun rovings, bulk molding compounds (BMC), extrusion, and filament winding. The FRPs are used to form products such as, for example, car bodies, bath and shower stalls, piping, golf clubs, and sky lights.

The following examples are presented to further illustrate and explain the present invention and should not be taken as limiting in any regard.

EXAMPLE 1

Preparation of Polymer Latexes

A series of polymer latexes was prepared via emulsion polymerization. The monomer compositions are set forth in Table 1. Monomer compositions contained therein are given as weight percent, based on the total weight of monomer(s). The weight percent of each monomer is listed in ( ) in the Table. Samples A, B, and C are comparative examples.

Sizing Compositions and Application

Sizing compositions were prepared for each polymer according to the following formulation:

| Components | Grams |
| --- | --- |
| Polymer Latex (50% solids) | 80.00 |
| Silane A-174 | 2.89 |
| Acetic acid | 0.20 |
| Emery 6760 | 1.40 |
| Water | 504.30 |

The sizing compositions were applied to unsized glass fiber strands at 2 percent solids based on the glass fiber weight. The strand was immersed in a bath of the sizing composition and passed through two squeeze rollers to remove excess size. The strand was wound onto a tube and allowed to air dry. After air drying, the glass was cured at 130° C. for 30 minutes. The glass was allowed to condition overnight at 50 percent relative humidity and 70° F., prior to preparing FRPs.

Lamination Resin

Polyester lamination resins were prepared according to the following formulation. DERAKANE 470-300 is an epoxy novolac-based vinyl ester resin from Dow.

| Components | Grams |
| --- | --- |
| DERAKANE 470-300 | 500.00 |
| MEK peroxide | 6.0 |
| Cobalt napthalate (10%) | 1.0 |

FRP Preparation

The glass fiber strand was chopped to a length of 2 inches and incorporated into the plastic resin according to the following procedure at a level of 28 percent by weight, based on the total weight of the FRP. The sized, chopped glass fibers were placed on a flat panel and the plastic resin poured onto the chopped glass. The glass was worked into the resin with minimum force. The combination of the treated glass fibers and the plastic resin was covered by a second flat plate and pressed to a constant thickness. The combination was heated in a force draft oven at 80° C. for fifty minutes to effect curing. The cured FRP was removed from the oven and allowed to cool to room temperature.

FRP Clarity

The FRPs prepared from the respective high and low molecular weight polymers were visually evaluated for clarity and the presence of white glass. FRPs were rated subjectively as poor, fair, good, good, or excellent.

Intrinsic Viscosity (IV)

Intrinsic viscosity was measured by dissolving 1 gram of the dried polymer in acetone. IV is then measured in a flow test at 30° C. using a Canon 50Y767 flow tube.

Molecular weight (Mw) is the weight average molecular weight of the polymer. Molecular weight was measured by GPC, using THF as the solvent. Molecular weight was measured on only some of the samples.

TABLE 1

| Sample | Monomer Composition | Functional Monomer | Stabilization | IV | Mw | White Glass |
| --- | --- | --- | --- | --- | --- | --- |
| A | VA (100) | — | HEC | 0.48 | — | Poor |
| B | VA (100) | — | PVOH | 1.9 | — | Poor |
| C | VA/BA(88/12) | — | HEC/Surf. | 0.45 | — | Poor |
| D | VA(97) | GMA(3) | Surf. | 0.40 | — | Fair |
| E | VA(94) | HPA(6) | Surf. | 0.30 | 65,000 | Excellent |
| F | VA(94) | HPA(6) | Surf. | 0.64 | 217,000 | Good |
| G | VA(94) | HPA(6) | Surf. | 0.40 | 117,000 | Excellent |
| H | VA(94) | HPA(6) | Surf. | 0.67 | 238,000 | Excellent |
| I | VA(94) | HBA(6) | Surf. | 0.52 | — | Very Good |
| J | VA(94) | HBA(6) | Surf. | 0.79 | 467,000 | Fair |
| K | VA(94) | HBA(6) | Surf. | 0.45 | 153,000 | Excellent |

TABLE 1-continued

| Sample | Monomer Composition | Functional Monomer | Stabilization | IV | Mw | White Glass |
|---|---|---|---|---|---|---|
| L | VA(97) | HBA(3) | Surf. | 0.47 | 170,000 | Good |
| M | VA(97) | PEA(3) | Surf. | 0.55 | — | Excellent |
| N | VA(97) | PEA(3) | Surf. | 0.70 | — | Good |
| O | VA(97) | PEA(3) | Surf. | 0.45 | — | Excellent |
| P | VA(94) | PEA(6) | Surf. | 0.39 | — | Excellent |
| Q | VA/BA(94/3) | HEMA(3) | Surf. | 0.35 | 95,000 | Excellent |
| R | VA/BA(94/3) | HEMA(3) | Surf. | 0.38 | — | Very Good |
| S | VA/BA(94/3) | PEMA(3) | Surf. | 0.48 | — | Very Good |
| T | VA(97) | PGMEA(3) | Surf. | 0.38 | — | Very Good |
| U | VA(97) | PGMEA(3) | Surf. | 0.65 | — | Fair |
| V | MMA/EA (45/45) | HPA (10) | Surf. | — | — | Very Good |
| W | MMA/EA (43/37) | HPA (20) | Surf. | — | — | Very Good |

BA Butyl Acrylate
EA Ethyl Acrylate
GMA Glycidyl Methacrylate
HBA Hydroxy Butyl Acrylate
HPA Hydroxy Propyl Acrylate
MMA Methyl Methacrylate
PEA Phenoxy Ethyl Acrylate
PEMA Phenoxy Ethyl Methacrylate
PGMEA Polyethylene Glycol Methoxy Acrylate
VA Vinyl Acetate

What is claimed is:

1. A fiber-reinforced plastic comprising a plastic resin and glass fibers, where the plastic resin is selected from the group consisting of epoxy, epoxy novalac resin, and low-styrene epoxy resins, and wherein said glass fibers have directly coated thereon a film-forming functional copolymer composition comprising:
   a) 0.1 to 30 percent by weight of functional monomer units selected from the group consisting of hydroxyl functional monomer units, phenyl functional monomer units, alkoxylated functional monomer units, and mixtures thereof, wherein the alkoxylated functional monomer has a group with the formula —(RO)$_n$— where R is a methyl, ethyl, propyl or butyl group, or a mixture thereof, and n is from 1 to 50; and
   b) 70 to 99.9 percent by weight of one or more non-functional ethylenically unsaturated monomer units, wherein said functional polymer has a molecular weight of greater than 55,000, wherein said fiber-reinforced plastic exhibits less white glass as compared with a like fiber-reinforced plastic which contains glass fiber which is sized with a like film-forming composition without said functional monomer units.

2. A fiber-reinforced plastic comprising glass fibers and a plastic matrix resin selected from the group consisting of epoxy, epoxy novolac resins, and low-styrene epoxy resins, wherein said glass fibers are sized with a film-forming functional copolymer composition comprising:
   c) 0.1 to 30 percent by weight of phenyl functional monomer units; and
   d) 70 to 99.9 percent by weight of one or more non-functional ethylenically unsaturated monomer units.

3. The fiber-reinforced plastic of claim 2, wherein the phenyl functional monomer units comprise phenoxyethyl (meth) acrylate.

4. The fiber-reinforced plastic of claim 2, wherein the functional polymer has a molecular weight of greater than 55,000.

* * * * *